J. D. Lynde,

Steam-Boiler Indicator.

No. 4,049. Reissued June 28, 1870.

Witnesses:
Nathan Dodge
Samuel C. Cole

Inventor:
John D. Lynde

N. PETERS, PHOTO-LITHOGRAPHER, WASHINGTON, D. C.

United States Patent Office.

JOHN D. LYNDE, OF PHILADELPHIA, PENNSYLVANIA.

*Letters Patent No.* 74,389, *dated February* 11, 1868; *reissue No.* 4,049, *dated June* 28, 1870.

WATER-INDICATOR FOR BOILERS.

The Schedule referred to in these Letters Patent and making part of the same.

I, JOHN D. LYNDE, of Philadelphia, in the county of Philadelphia and State of Pennsylvania, have invented a new and useful Machine for Preventing Low Water in Steam-Boilers, of which the following is a specification.

The object of this invention is to obviate the difficulties experienced in similar articles from sediment, deposits of lime, sticking of valves, &c., which prevent the desired operation. The certainty of its accomplishing the needed result will appear from the description of the accompanying drawing.

Figure 1:
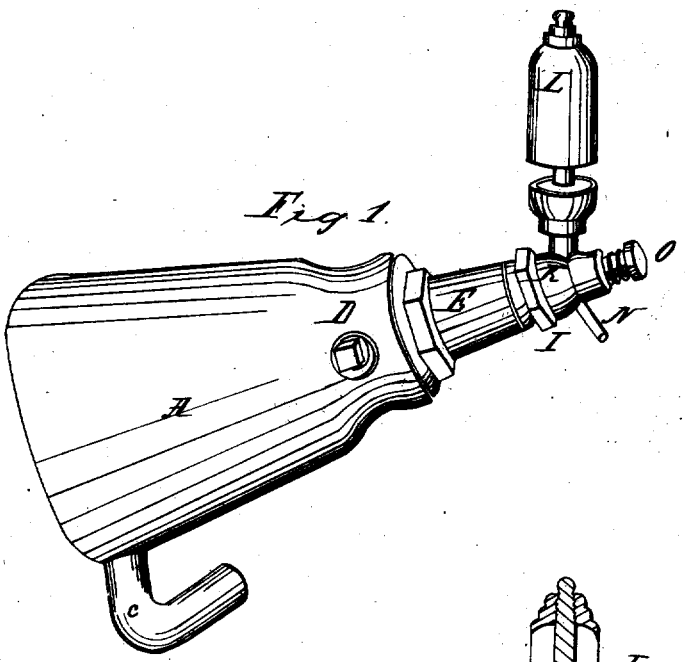
Figure 1 is a perspective view.
Figure 2:
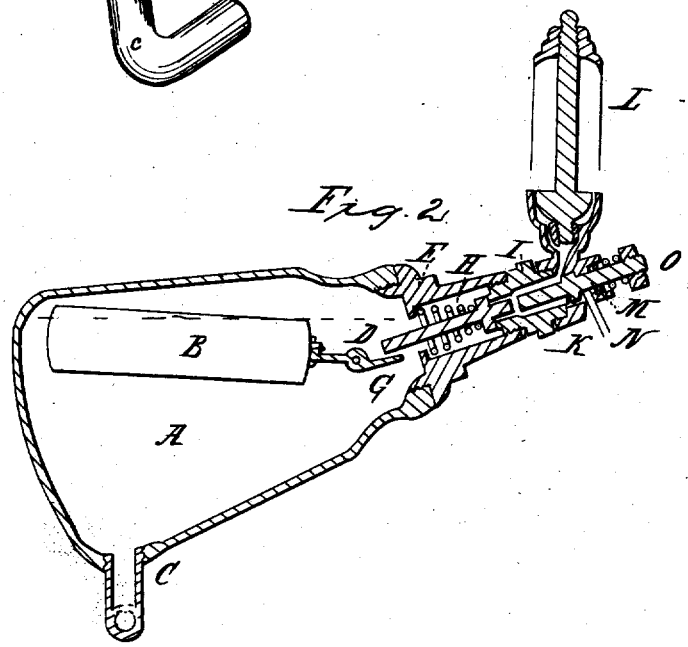
Figure 2 is a longitudinal elevation.

A is a cast-iron case, connected to the boiler by the pipe C, which may be of a convenient length to suit, and supplied with a steam-cock, to close communication, when desired.

B is a metallic float, of a size that will enter the aperture in A, and hung at one end on the pin D by the lever G.

E is a brass mouth-piece and valve-case.

F is a valve-stem and valve.

H is a conical spiral spring, which holds valve F on its seat.

I is the valve-seat and stopper to E.

K is a brass cap, which supports the whistle L, the detached valve-stem M, and is held firmly upright by a set-screw.

The operation is as follows:

The pipe C is connected to the boiler at the line at which an alarm is desired, and, so long as the water in the boiler is above said connection, the pressure of steam will keep A nearly filled with water, and the float will be raised, the dotted line being about the surface of the water. The indicator may now be used as a gauge-cock by pressing on the detached valve-stem at O. F is pushed from the seat, and water runs from pipe N.

When the water in the boiler begins to fall by the aperture in pipe C, the water will drop out of A, the float falls, tipping the valve and stem F by lever G, and the valve is opened sufficiently to allow steam to rush through and sound the whistle. Start the pump or injector, and, as soon as the water rises, the indicator, being automatic, ceases to alarm.

It will be seen that there is no friction of parts, and, as the valve bears on a flat seat, and is in constant use, there is no possibility of its sticking, while the immense leverage insures a certain operation, and, being connected to the boiler by a single pipe, no circulation is taking place; neither does the water boil in it; therefore no sediment or scale is being deposited, making it a perfectly trustworthy and reliable alarm.

I claim as my invention—

1. The combination of the valve and stem F, spiral spring H, case E, valve-seat I, and lever G, constructed substantially as described, so that the valve may be tipped on its seat, as herein set forth.

2. The arrangement of the lever G, valve-stem F, spring H, valve M, pipe N, with reference to the float B, whistle L, and case A, whereby to sound an alarm when the water is too low in the boiler, and to ascertain the condition of the water at other times, substantially as described.

JOHN D. LYNDE.

Witnesses:

C. A. LYNDE,

JOHN H. SEBOLD.